United States Patent
Maher et al.

(10) Patent No.: US 6,309,995 B1
(45) Date of Patent: Oct. 30, 2001

(54) MAGNESIUM ZINC TITANATE POWDER WITH A BARIUM BORON LITHIUM SILICATE FLUX AND A MULTILAYER CERAMIC COG CAPACITOR MADE THEREFROM

(75) Inventors: Galeb H. Maher; Samir G. Maher, both of Williamstown, MA (US)

(73) Assignee: MRA Laboratories, Inc., North Adams, MA (US)

( * ) Notice: Subject to any disclaimer, the term of this patent is extended or adjusted under 35 U.S.C. 154(b) by 0 days.

(21) Appl. No.: 09/652,562

(22) Filed: Aug. 31, 2000

Related U.S. Application Data

(63) Continuation-in-part of application No. 09/224,536, filed on Dec. 31, 1998, now abandoned.

(51) Int. Cl.$^7$ .................. C04B 35/468; C04B 35/465
(52) U.S. Cl. ............................ 501/138; 501/136
(58) Field of Search ..................... 501/136, 138

(56) References Cited

U.S. PATENT DOCUMENTS

| | | | |
|---|---|---|---|
| 4,475,144 | 10/1984 | Lagrange et al. | 361/321 |
| 4,533,974 | 8/1985 | Maher | 361/320 |
| 4,612,600 | 9/1986 | Hodgkins | 361/321 |
| 4,898,844 * | 2/1990 | Maher et al. | 501/138 |
| 5,089,933 * | 2/1992 | Saito et al. | 361/321 |
| 5,790,367 | 8/1984 | Mateika et al. | 361/321.4 |

OTHER PUBLICATIONS

Tolino et al. Effect of Ba:Ti Ratio on Densification of LiF–Fluxed BaTiO3, J. Amer. Ceramic Soc., v. 55, (1996.) No month provided.

Walker, Jr. et al. Densification and Strength of BaTiO3 with LiF and MgO Additives, Ceramic Bulletin of the Amer. Ceramic Soc. v. 55, (1996.) No month provided.

* cited by examiner

*Primary Examiner*—David Brunsman

(57) ABSTRACT

In a start powder mixture of magnesium zinc titanate and a barium lithium boro-silicate flux, it is discovered that the addition of lithium to the flux enables the manufacture of multilayer ceramic capacitors using the powder mixture, that perform to the COG standard including an accelerated life test. This addition of lithium also makes possible the sintering to maturity of COG multilayer capacitors at temperatures as low as 950° C., which in turn allows the use of silver-palladium alloy buried electrodes of high silver and low palladium content which in turn lead to higher capacitor Q and lower manufacturing costs.

18 Claims, 1 Drawing Sheet

MAGNESIUM ZINC TITANATE POWDER WITH A BARIUM BORON LITHIUM SILICATE FLUX AND A MULTILAYER CERAMIC COG CAPACITOR MADE THEREFROM

CROSS REFERENCES TO RELATED APPLICATIONS

This application is a continuation-in-part of my patent application Ser. No. 09/224,536 filed Dec. 31, 1998 now abandoned.

FIELD OF THE INVENTION

The present invention relates to multilayer ceramic capacitors meeting the COG standard and having a ceramic dielectric that is based upon a magnesium zinc titanate combined with a glass containing sintering flux, which combined materials are capable of being sintered to maturity at well below 1100° C.

BACKGROUND OF THE INVENTION

Temperature stable ceramic capacitors meeting the EIA standard, COG, (a.k.a. NPO), must exhibit a change in capacitance of within +/−30 ppm over the temperature range of from −55° C. to 125° C. Such capacitors also must have a quality factor, Q, that is greater than 1,000 measured at 1 megahertz, which is equivalent to the dissipation factor (DF) being no greater than 0.01. Ceramic precursor powders having been fired under conditions to achieve a mature ceramic at 95 percent or more of the theoretically possible density are most likely to provide such high quality dielectric ceramics. The sintering of high-firing ceramic precursor materials such as magnesium zinc titanate is typically achieved at a temperature of 1100° C. It is well known to add a small quantity of glass containing flux as a sintering aid to the high-firing ceramic powders to reduce the sintering temperature necessary for yielding a mature dielectric ceramic. Examples of COG ceramic compositions sinterable at about 1100° C. are found in patents U.S. Pat. No. 4,882,650 issued Nov. 11, 1989 and U.S. Pat. No. 4,533,974 issued Aug. 6, 1985.

When making a multi-layer capacitor (MLC), a metal sheet electrodes are interspersed between successive layers of the green precursor ceramic powder which includes the flux if any. Thus the buried metal electrodes in the green (unfired) ceramic must be subjected to a temperature high enough to sinter the ceramic to maturity. The most commonly used formulation for the metal electrode is by weight 70% Ag and 30% Pd. This formulation has a melting temperature of 1150° C. and is typically used for the electrodes in MLC capacitors that are to be heated to temperatures no higher than 1140° C. to avoid the risk that the metal would melt and run out. When using sintering furnaces that cannot be relied upon to hold the temperature to within that 10° C. difference, an even lower furnace temperature setting must be used, and a further 10° C. safety factor is typically used in MLC manufacturing.

The addition of larger amounts of the sintering flux will enable a lower MLC sintering temperature hut at the cost of a reduced dielectric constant (K) and other degraded performance measures such as Q. Known start formulations of ceramic precursor plus flux, that can he sintered to a high density at lower temperatures than about 1100° C. are relatively rare, and the industrial use of such a start powder mixture is even more rare because the formulations and the sintering conditions become more critical leading to lower yields.

The cost of palladium is an order of magnitude greater than the cost of silver and palladium is typically the greatest cost factor in the manufacture of a MLC capacitor. One alternative to the use of palladium in a buried electrode is the use of a base metal such as nickel and or copper. However with base metal electrodes, sintering must be accomplished at less than the melting points of the base metal, which for nickel is 1453° C. but for copper is 1083° C. And sintering must be effected in a rare-oxygen atmosphere which greatly complicates the process. Control of a low oxygen pressure atmosphere itself leads to increased costs, and the choices of ceramic composition that do not become semiconducting due to loss of oxygen at sintering are severely limiting with respect to any particular dielectric ceramic performance that may be obtained.

The flux used in many air-fired MLC capacitors contains oxides of bismuth cadmium and lead which are especially effective for lowering the melting point of the flux. For a given amount of flux, this advantageously leads to a further reduction of the sintering temperature. However, these oxides tend to reduce the Q of MLC capacitors and bismuth can react with silver palladium electrodes leading to an even poorer quality factor. These volatile heavy metal oxides also contaminate the sintering ovens leading to irregular sintering results. Perhaps most importantly they represent a hazard to the environment and especially a health hazard to personnel involved in making both the ceramic powder and the MLC capacitors.

It is therefore an object of this invention to provide a ceramic powder for use in making multilayer ceramic capacitors meeting the COG standard, which start powder is capable of being sintered to maturity in an air atmosphere at a temperature of 1000°+/−50° C. so that the MLC may contain electrodes of a more silver rich and less costly composition e.g. 85% Ag/15% Pd.

It is a further object of this invention to provide such a ceramic powder that includes a high firing part comprised of a magnesium zinc titanate and a low firing flux part having essentially none of the hazardous heavy metal oxides of lead, bismuth and cadmium.

SUMMARY OF THE INVENTION

A dielectric ceramic powder mixture consists essentially of agglomerates and each agglomerate includes a homogenous group of two kinds of powder particles having been mildly calcined and superficially co-reacted to bind the group of powder particles together to form the agglomerate. One kind is a high-firing ceramic-precursor powder that is a magnesium zinc titanate which makes up from 87 to 98 weight percent of the dielectric ceramic powder mixture. The other kind is a powdered barium lithium boro-silicate sintering flux which makes up from 2 to 13 weight percent of the dielectric ceramic powder mixture.

The magnesium zinc titanate powder is preferably the fully reacted compound $Mg_{2/3}Zn_{1/3}TiO_3$, wherein there may be substituted for up to 20 mole percent of the Mg an equal molar amount of an alkaline earth metal, and alternatively in the case of only substituted barium up to 60 mole percent may be so substituted.

A particularly effective range of compositions for the barium lithium boro-silicate flux is from 10 to 55 weight percent $Li_4SiO_4$, from 3 to 40 weight percent $BaO.B_2O_3$ and 10 to 76 weight percent $3BaO.B_2O_3$. Another preferred range of flux compositions is from 22 to 26 weight percent $Li_4SiO_4$, from 20.5 to 23.5 weight percent $BaO.B_2O_3$ and from 50 to 56 percent $3BaO.B_2O_3$.

The above-described dielectric ceramic powder mixture is made by combining from 87 to 98 weight percent of a magnesium zinc titanate and from 2 to 13 weight percent of a powdered barium lithium boro-silicate sintering flux; mixing the combined powders to form a homogenous powder mixture; and mildly calcining the homogeneous mixture at from 600° C. to 750° C. to obtain a powder comprised of agglomerates of the homogeneous powder mixture wherein each of the agglomerates has essentially the same composition of magnesium zinc titanate and barium lithium boro-silicate as in the combined powders. The mildly calcined agglomerates may then be comminuted to render the dielectric ceramic powder mixture a free flowing powder having an average agglomerate size of about 1.2 micrometers.

A method for making a multilayer ceramic capacitor entails making a slurry by milling in an organic vehicle the dielectric ceramic powder mixture described above, forming layers of the slurry and drying the layers. A first patterned film of palladium silver alloy is deposited on one of the dried layers. Then a stack is formed by stacking at least a second green ceramic layer over the first patterned alloy film. A second patterned alloy film is deposited over the second green ceramic layer, and at least a third green ceramic layer is stacked on top of the second patterned film. The stack is then sintered at a temperature within the range of 950° C. to 1120° C. and after cooling a silver paste is applied to the ends of the body to which an edge of the first and second alloy patterns may extend. after heat curing the silver paste, terminations are formed contacting each of the first and second alloy layers. A nickel film may then be electroplated over the cured silver terminations.

This results in a multilayer ceramic capacitor comprising a dense mature ceramic body and at least one sheet electrode buried in the body, and having a ceramic body comprised of from 87 to 98 weight percent of a magnesium zinc titanate and from 2 to 13 weight percent of a powdered barium lithium boro-silicate sintering flux. The buried electrodes may be composed of an alloy of silver and palladium wherein the silver amounts to at least 80 weight percent. This invention recognizes that in the manufacture of a COG type MLC capacitor, a reduction in the required sintering temperature of the ceramic will permit incorporation of buried electrodes of increased silver content, and that an MLC capacitor which is provided with higher conductivity buried electrodes will exhibit higher Q values. And this is especially true for COG MLC capacitors wherein the Q value is more heavily dependent upon electrode resistivity and less dependent upon the inherent Q value of the dielectric ceramic itself. Thus the benefit of a lower sintering temperature of a COG multilayer capacitor can result in both a lower manufacturing cost and a better COG performance.

This invention further recognizes that the inclusion of lithium in the flux portion of the ceramic powder leads to a reduction in the melting temperature of the flux and to an unexpected mitigation of multilayer COG capacitor life test failures.

The objects of this invention have been met using the above described sintering flux of magnesium lithium boro-silicate. In fact, the objects of this invention have been exceeded in the sense that MLC capacitors can be made using a start powder of this invention and sintering at a temperature within the range of from about 940° C. to 1100° C.

DESCRIPTION OF THE PREFERRED EMBODIMENTS

Figure 1:
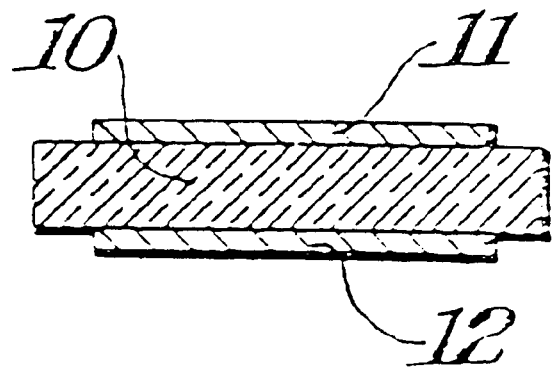
FIG. 1 shows in side sectional view a ceramic disc capacitor.

Experimental ceramic disc capacitors were made wherein the high firing component of the start powder was a magnesium zinc titanate. These experimental disc capacitors are constructed as illustrated in FIG. 1. The thin dielectric ceramic disc 10 has electrodes 11 and 12 adhered to opposite major surfaces of the disc capacitor. Disc capacitors are much easier to make than are multilayer capacitors and, with the exception of DF and Q measures of performance, all other measures for a particular composition and sintering conditions in a disc capacitor is a useful measure of performance to be got for a corresponding multilayer capacitor using the same start powder compositions.

Making the Start Ceramic Powder

A method for making a ceramic powder start mixture initially includes preparing a high firing powder mixture having an average particle size of about 1.0 micron by combining from 96 to 98 mole percent of precursors of a stoichiometric magnesium zinc titanate (MZT) wherein up to 4 mole % of the magnesium may be replaced by calcium. This can be accomplished by replacing a portion (e.g. 2.9 mole %) of magnesium titanate by an equal molar amount of calcium titanate. Likewise, other such partial substitutes of magnesium, that also may be used to adjust the TCC of the sintered-powder capacitor body, such as equal molar amounts of either barium oxide or barium zirconate. In the case of barium zirconate, it would then be substituted for equal molar amounts of magnesium titanate. Substituted amounts of barium in the magnesium zinc titanate may be as high as 60 mole percent as noted in the above-mentioned patent U.S. Pat. No. 4,882,650.

A second and low-melting glass-former containing powder is added to the above noted high-firing-temperature ceramic powder. The low-melting powder will serve as the sintering flux and is composed of the oxides, or equivalents thereto, of barium, boron and silicon.

These powders are then milled to form a homogenous powder mixture, which is then mildly calcined at approximately 600° C. to obtain a powder comprised of agglomerates of the powder mixture wherein each of the agglomerates has essentially the same composition as the precursor homogenous powder mixture and the average agglomerate size is about 1.2 micrometers.

Making Disc Capacitors

The process employed for making disc capacitors, such as the one shown in FIG. 1, is as follows. The start powder mixture is pressed at 15,000 pounds per square inch to a thickness of about 35 mils (0.89 mm)in a die mold having a diameter of half an inch (12.7 mm). The resulting green circular discs were then sintered at 1100 ° C. (unless otherwise noted below) for three hours. After cooling a silver paste was applied to the opposite surfaces of each sintered disc 10 which was subsequently heated to 800° C. to cure the electrodes 11 and 12.

The principal high firing start powders have the composition $Mg_{2/3}Zn_{1/3}TiO_3$ in some examples of which a small amount of calcium was substituted for an equal molar amount (e.g. 2.9 mole %) of magnesium. Alternatively, in others some $BaZrO_3$ is simply added. Such alkaline earth metal substitutions or additions in magnesium zinc titanate may advantageously serve to adjust the temperature coefficient of capacitance (TCC) of the sintered disc capacitor. About 0.01 weight percent manganese carbonate is also added, which is typically used for improving life test performance in dielectric ceramic formulations of a wide variety. There is also included in the start mixture a powdered barium boro-silicate sintering flux.

Referring to Tables I and II, a dual-component flux of barium borate and zinc silicate was effective when the dielectric ceramic powder was sintered in the range of 1100° C., and 1150° C., notwithstanding Example 6a of Table II. Using only 0.5 wt % $3BaO.B_2O_3$, and 1.0 wt % $Zn_2SiO_4$, the capacitors, when fired, yielded very high densities and a K of 23 or 24.

Moreover, the TCC's were well within the COG standard. Further, the DFs were low, especially as shown by Examples 3, 4 and 7. These capacitor examples exhibited Q factors of at least 10,000. Although Example 2 (prepared with 1.2 wt % $3BaO_2.B_2O_3$ and 1.0 wt % $Zn_2SiO_4$) and Example 6a did not reach maturity whereas the same formulation when fired at 1150° C. did mature and perform marginally well initially.

In testing the MZCT Examples 1 through 6b, having the dual-component barium borate and zinc silicate sintering flux, it was discovered that the fired capacitors failed the life expectancy tests. As shown in Table II, different additives were used to extend the life expectancy, without effect, notwithstanding that some of the additives were well known and have been used to extend life expectancy ($BaCO_3$, $BaZrO_3$, $MnCO_3$ and $Y_2O_3$). As shown via Examples 1 through 6b of Table II, these capacitors failed the life expectancy tests.

When a small amount of lithium carbonate (0.3 wt %) was tested to determine whether lithium carbonate may effect life expectancy, lithium carbonate's effectiveness was dramatic and unexpected. Those capacitors with $Li_2CO_3$ passed the life expectancy tests, while still exhibiting excellent electrical and linear properties, as shown by Example 7 of Tables I and II. Thereafter, $Li_2SiO_4$ was tested for its effect on life expectancy. As with the $LiCO_3$, those capacitors with $Li_2SiO_4$ passed the life expectancy test and achieved good electrical and linear properties, as shown by Example 8 of Tables I and II. The lower Q factor of Example 8, compared to Example 7) was likely due to the lower sintering temperature of 1,110° C. Examples 7 and 8 were within the COG standard.

Magnesium Zinc Calcium Titanate with Barium Lithium Boro-silicate Flux

A series of experimental disc capacitors were made wherein the start powder composition was 90 weight percent of the above noted magnesium zinc calcium titanate and 10 weight percent of a lithium silicate barium borate flux.

With reference to Table III, a first group A of experimental disc capacitors, i.e. Examples 9–12, include a flux in the start powder composed of 1 mole of lithium silicate ($Li_4SiO_4$), 3 moles of a high-barium borate ($BaO.B_2O_3$) and 1 mole of barium borate ($BaO.B_2O_3$). The flux composition is also given for each example as weight percent of the total flux as shown in three additional columns of Table III. There were four disc capacitors in each example. The four disc capacitors of Example 9 were sintered at 1000° C., Example 10 capacitors were sintered at 975° C., Example 11 capacitors were sintered at 950° C. and Example 12 capacitors were sintered at 925° C., all as shown in Table III.

The flux compositions (B, C, D, E, F, G, H and I), respectively, of the second through ninth groups of experimental disc capacitors, examples 13–16, 17–20, 21–24, 25–28, 29–32, 33–36, 37–40 and 41–44 are each similarly represented in six middle columns of Table III.

The four disc capacitors in each example, after sintering and cooling, were measured and the average of the four values obtained for each of dissipation factor (DF), dielectric constant (K) at an ambient temperature of 23° C., and the temperature coefficient of capacitance (TCC) measured as percent change in K at −55° C. and +125° C. These data are presented in the last five columns of Table III.

None of the nine compositions fired at 925° C. densified and matured. They were porous. It is further seen that capacitors in Examples 9 and 10, having the start-powder composition in group A and having been sintered at 1000° C. and 975° C., failed the COG TCC criterion; that criterion being no greater change than 30% in dielectric constant (K) at either −55° C. or +125° C. relative to the room temperature K. That COG TCC criterion was also failed by capacitors having been sintered at the higher temperature of 1000° C. for compositions of groups C, D, E and F, corresponding to Examples 17, 21, 25 and 29. For all the examples that densified at sintering, including at least two of each of the compositions groups A though I, the dielectric constant ranges from 21 to 23 which is typical of COG capacitors of the prior art that are usually fired at 1100° C. and up, and all of the experimental nine compositions here that reached maturity at firing have a satisfactory K. But from the performance of the capacitors represented in Table III, it is seen that some of the start-powder formulations, e.g of groups G, H and I, provide exceptionally good COG performance when sintered in a range that includes 1000° C., 975° C. and 950° C. And, all of the formulations of the start-powder compositions represented in Table III provide COG performance after sintering at some point within the range including 975° C. and 950° C.

Effect Upon COG Performance of a Process for Providing Conductive Terminations to the MLC Body Ends Multilayer ceramic (MLC) capacitors were made by the following prior art method to evaluate how electrical end-termination of the capacitors affects COG performance.

A slurry was formed by milling the above start powder mixture in an liquid organic vehicle. A layer of some of the slurry was spread onto a flat substrate and dried. A film of palladium-silver ink was screened in a pattern over the dry layer of ceramic slurry.

Additional layers of slurry and electroding paste are built up by either the curtain coating process, or by the tape process described hereinabove, so that ultimately metal ink film patterns are respectively deposited between successive adjacent pairs of the ceramic layers to create a stack of dried "green" ceramic layers with patterned electroding layers interspersed therebetween.

Figure 2:
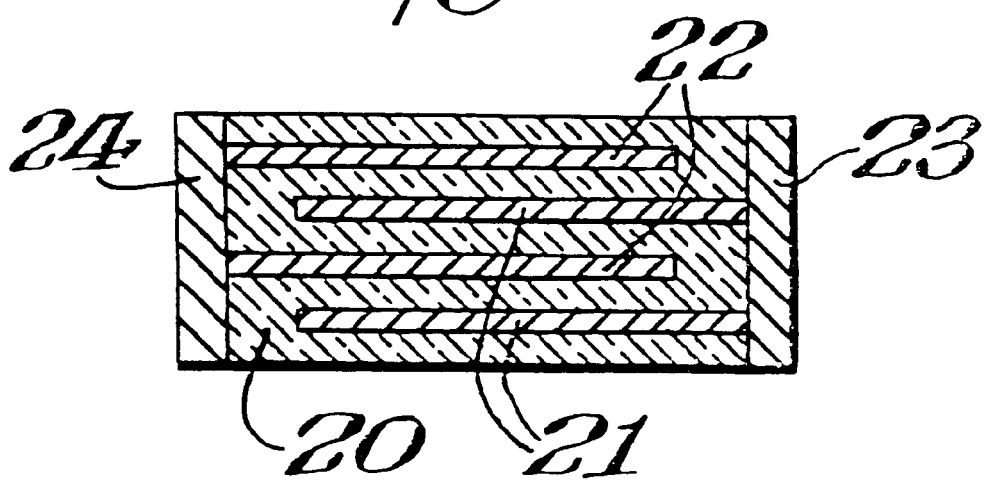
FIG. 2 shows in side sectional view a multilayer ceramic (MLC) capacitor with buried electrodes.

The body 20, as shown in FIG. 2 has ceramic layers 21 and buried electrodes 22. The piece so cut from the stack is now a green ceramic body that is heated to drive out the organic components and bisked to harden the green MLC bodies, which are now ready for sintering.

Referring to Table IV, the series of MLC capacitor bodies, Examples 45, 46, 47, 48, 49, 50, 51, 52 and 53 were made by the above method wherein the high firing start powder was the same magnesium zinc calcium titanate (MZCT) as in Examples 1–8. But an end-termination process was introduced and varied as well as is the MZCT content in the start powder and sintering temperature.

A commonly employed process for depositing a solderable conducting termination to opposite ends of the multilayer ceramic capacitor chip entails applying a silver paste to either end of body 20 (FIG. 2) at which ends a set of alternate of the buried electrodes were exposed, and the body is heated at 750° C. for a few minutes to form silver terminations 25 and 26. However, especially for COG MLC capacitors, it is known to take the additional steps of forming a nickel barrier layer over the silver terminations by electroplating and then applying a tin-lead solder coating over the nickel. This provides a low resistance and more reliable connection between the buried electrode ends and the silver termination layer. It also provides terminations whereby the capacitor can be more easily surface mounted to a circuit board.

The termination process has been varied by omitting the inserting the desired nickel plating and solder steps in some of these experiments for which data is shown in Table IV. After the capacitors were cooled to room temperature, a sample group of these sintered capacitor bodies were then terminated by the direct application of a silver paste to the body ends and then heated to cure the terminations. Capacitors of this sample group were evaluated for capacitance (enabling calculation of the dielectric constant, K), the dissipation factor (DF) and TCC. The remaining sintered bodies were nickel electroplated and solder coated and then subjected to a life test, i.e. by applying 300 volts DC across the terminals, amounting to from 12 to 15 volts per micrometer of dielectric thickness, while holding the temperature of the capacitors at 125° C. A capacitor is deemed to have failed this life test if the initial value of the insulation resistance of the capacitor falls two orders of magnitude within the first hundred hours on life test.

The silver terminations of the MLC capacitors in Examples 45, 47, 49 and 52 of Table IV were all nickel plated and solder coated, whereas capacitor terminations of Examples 46, 48, 50, 51 and 53 were not. It can be seen that the capacitors in Examples 45, 46 and 47 have the same ceramic composition including 10 wt % of the flux (same flux as in Group C of Table III), but regardless of sintering temperature, the plated capacitors of Examples 45 and 47 failed the life test. However the capacitors of the remainder of Examples 48 through 53 all passed life test whether or not they were pre nickel electroplated; these capacitors all contained either 5 wt % or 7.5 wt % flux. The greater amount of flux compromised COG capacitors at life test that were otherwise good. It is thus preferred to use less than 8 wt % of the barium lithium boro-silicate flux in MLC capacitors of this invention, when the silvered MLC body ends are to be nickel electroplated.

It is seen from the data in Tables III and IV that relatively large amounts of the barium lithium boro-silicate flux may be used to produce COG capacitors, while at the same time permitting the buried electrodes to be much less palladium rich than the usual 70% Ag/30% Pd alloy.

Effect Upon COG Performance of Different Amounts of Barium Lithium Boro-silicate Flux A series of MLC capacitors were made wherein the amount of flux in the start powder mixture was varied over the range 0 to 12 weight percent, and the sintering temperature was varied from 950° to 1130° C. These variables along with the corresponding test data are shown in Table V. For this series of experimental capacitors, the start powders employ $Mg_{2/3}Zn_{1/3}TiO_3$ plus 2.9 wt % of CaO, and the flux is composed of 22.61 wt % $BaO.B_2O_3$, 53.23 wt % $3BaO.B_2O_3$ and 24.16 wt % $Li_4Si_4$. Here it is demonstrated that it is feasible to sinter these COG start materials to maturity at any temperature between 950° C. to 1130° C. using an appropriate amount of the flux. The Examples 62, 63, 64 and 64 wherein a large amount of flux (10–12 wt %) was used, provide excellent COG performance. Examples 59–61 using a moderate amount of flux (5–8 wt %) are also very good. Example 58 shows that at 5 wt % flux the sintering temperature of 1000° C. is too low for the start powders to fully react and reach maturity. Examples 54 through 57 all fired at 1130° C. did sinter and produce good dielectric bodies, but did not meet the TCC limits of the COG standard. It is believed that the substitution in the magnesium zinc calcium titanate of a small bit of barium titanate substituting for the calcium titanate would likely bring the TCC performance closer to the COG limits. However, this invention is deemed to be limited to inclusion of the flux in amounts no less than 2 weight percent, excluding the formulation of the Example 56.

TABLE I

| | | | | Composition in (w %) | | | | | | | | | |
|---|---|---|---|---|---|---|---|---|---|---|---|---|---|
| Example | MZCT | $Nb_2O_5$ | $CcaTiO_3$ | $3BaO.B_2O_3$ | $Zn_2SiO_4$ | $BaCO_3$ | $BaZrO_3$ | $Mg_2TiO_4$ | $MnCO_3$ | $BaTiO_3$ | $Y_2O_3$ | $Li_2CO_3$ | $Li_4SiO_4$ |
| 1 | 97.85 | 0.25 | 0.2 | 0.5 | 1 | 0.2 | 0 | 0 | 0 | 0 | 0 | 0 | 0 |
| 2 | 91.55 | 0.25 | 0 | 1.2 | 1 | 0 | 0 | 3 | 0 | 3 | 0 | 0 | 0 |
| 3 | 97.65 | 0.25 | 0.2 | 0.5 | 1 | 0.4 | 0 | 0 | 0 | 0 | 0 | 0 | 0 |
| 4 | 97.75 | 0.25 | 0.2 | 0.5 | 1 | 0.2 | 0 | 0 | 0.1 | 0 | 0 | 0 | 0 |
| 5 | 92.05 | 0.25 | 0.2 | 0.5 | 1 | 0 | 6 | 0 | 0 | 0 | 0 | 0 | 0 |
| 6 | 91.55 | 0.25 | 0.2 | 0.5 | 1 | 0 | 6 | 0 | 0 | 0 | 0.5 | 0 | 0 |
| 7 | 96.25 | 0.25 | 0.2 | 0.5 | 1 | 0 | 1.5 | 0 | 0 | 0 | 0 | 0.3 | 0 |
| 8 | 96.25 | 0.25 | 0.2 | 0.5 | 1 | 0 | 1.5 | 0 | 0 | 0 | 0 | 0 | 0.3 |

TABLE Ia

Magnesium Zinc Calcium Titanate (MZCT)

| Oxide | W % | M % |
|---|---|---|
| MgO | 18.66 | 31 |
| ZnO | 18.84 | 15.5 |
| CaO | 2.89 | 3.5 |
| $TiO_2$ | 59.6 | 50 |

TABLE II

| Example | Sintering Temp. °C. | Density g/cm³ | Capacitance 1 MHZ(PF) | K | % DF 1 MHz | UDBD volts | IR, @ 300V, 125° C. 0.5 hrs., (ohm) | Life Test 300V, 125° C. 100 Hrs |
|---|---|---|---|---|---|---|---|---|
| 1 | 1100 | 4.17 | 355 | 24 | 0.03 | 655 | >10⁹ | Failed after 1 Hr |
| 2 | 1130 | 4.07 | 265 | 24 | N/A | N/A | N/A | Failed after 20 Hrs |
| 3 | 1130 | 4.19 | 428 | 24 | 0.01 | 2100 | >10⁹ | Failed after 10 Hrs |
| 4 | 1130 | 4.26 | 420 | 23 | 0.01 | 2340 | >10⁹ | Failed after 10 Hrs |
| 5 | 1140 | 4.02 | 432 | 23 | N/A | N/A | >10⁹ | Failed after 1 Hr. |
| 6a | 1130 | Porous | N/A | N/A | N/A | N/A | N/A | N/A |
| 6b | 1150 | 4.18 | 417 | 23 | 0.09 | 1860 | >10⁹ | Failed after 2 Hrs. |
| 7 | 1130 | 4.27 | 411 | 23 | 0 | 2110 | >10¹¹ | Passed |
| 8 | 1110 | 4.2 | 407 | 23 | 0.04 | 1800 | >10¹¹ | Passed |

TABLE III

| Group | Example | Sintering Temp. °C | Molar $Li_4SiO_4$ | Molar $3BaO.B_2O_3$ | Molar $BaO.B_2O_3$ | Weight % $Li_4SiO_4$ | Weight % $3BaO.B_2O_3$ | Weight % $BaO.B_2O_3$ | Density G/cm³ | K | % DF | TCC (PPM/°C.) -55 to 25 | TCC (PPM/°C.) 25 to 125 |
|---|---|---|---|---|---|---|---|---|---|---|---|---|---|
| A | 9 | 1000 | 50 | 12.5 | 37.5 | 28.6 | 31.4 | 40 | 4.16 | 23 | 0.05 | -40 | 30 |
|  | 10 | 975 | 50 | 12.5 | 37.5 | 28.6 | 31.4 | 40 | 4.18 | 23 | 0.1 | -49 | 52 |
|  | 11 | 950 | 50 | 12.5 | 37.5 | 28.6 | 31.4 | 40 | 4.13 | 22 | 0.04 | 1 | 24 |
|  | 12 | 925 | 50 | 12.5 | 37.5 | 28.6 | 31.4 | 40 | Porous | — | — | — | — |
| B | 13 | 1000 | 50 | 37.5 | 12.5 | 21 | 69.2 | 9.8 | 4.15 | 22 | 0 | 17 | 3 |
|  | 14 | 975 | 50 | 37.5 | 12.5 | 21 | 69.2 | 9.8 | 4.12 | 22 | 0.01 | 8 | 16 |
|  | 15 | 950 | 50 | 37.5 | 12.5 | 21 | 69.2 | 9.8 | 4.04 | 21 | 0 | 2 | 21 |
|  | 16 | 925 | 50 | 37.5 | 12.5 | 21 | 69.2 | 9.8 | Porous | — | — | — | — |
| C | 17 | 1000 | 50 | 25 | 25 | 24.2 | 53.2 | 22.6 | 4.11 | 22 | 0 | 24 | -66 |
|  | 18 | 975 | 50 | 25 | 25 | 24.2 | 53.2 | 22.6 | 4.1 | 22 | 0.02 | 25 | 2 |
|  | 19 | 950 | 50 | 25 | 25 | 24.2 | 53.2 | 22.6 | 3.97 | 21 | 0 | 21 | 5 |
|  | 20 | 925 | 50 | 25 | 25 | 24.2 | 53.2 | 22.6 | Porous | — | — | — | — |
| D | 21 | 1000 | 30 | 25 | 45 | 13.4 | 49.1 | 37.5 | 4.12 | 21 | 0 | 0 | -53 |
|  | 22 | 975 | 30 | 25 | 45 | 13.4 | 49.1 | 37.5 | 4.12 | 21 | 0.02 | -8 | 25 |
|  | 23 | 950 | 30 | 25 | 45 | 13.4 | 49.1 | 37.5 | 4.11 | 21 | 0 | -5 | 28 |
|  | 24 | 925 | 30 | 25 | 45 | 13.4 | 49.I | 37.5 | Porous | — | — | — | — |
| E | 25 | 1000 | 60 | 25 | 15 | 30.3 | 55.5 | 14.2 | 4.17 | 22 | 0 | 22 | -67 |
|  | 26 | 975 | 60 | 25 | 15 | 30.3 | 55.5 | 14.2 | 4.15 | 22 | 0.0I | 15 | 7 |
|  | 27 | 950 | 60 | 25 | 15 | 30.3 | 55.5 | 14.2 | 4.05 | 21 | 0 | 12 | 14 |
|  | 28 | 925 | 60 | 25 | 15 | 30.3 | 55.5 | 14.2 | Porous | — | — | — | — |
| F | 29 | 1000 | 70 | 25 | 5 | 37 | 58 | 5 | 4.16 | 22 | 0 | 16 | -58 |
|  | 30 | 975 | 70 | 25 | 5 | 37 | 58 | 5 | 4.15 | 21 | 0.02 | 6 | 13 |
|  | 31 | 950 | 70 | 25 | 5 | 37 | 58 | 5 | 4.08 | 21 | 0 | 8 | 19 |
|  | 32 | 925 | 70 | 25 | 5 | 37 | 58 | 5 | Porous | — | — | — | — |
| G | 33 | 1000 | 30 | 45 | 25 | 11 | 72 | 17 | 4.17 | 22 | 0.01 | 22 | 5 |
|  | 34 | 975 | 30 | 45 | 25 | 11 | 72 | 17 | 4.18 | 22 | 0.04 | -1 | 18 |
|  | 35 | 950 | 30 | 45 | 25 | 11 | 72 | 17 | 4.04 | 21 | 0.03 | 15 | 11 |
|  | 36 | 925 | 30 | 45 | 25 | 11 | 72 | 17 | Porous | — | — | — | — |
| H | 37 | 1000 | 60 | 15 | 25 | 34.8 | 38.2 | 27 | 4.1 | 21 | 0 | 13 | 18 |
|  | 38 | 975 | 60 | 15 | 25 | 34.8 | 38.2 | 27 | 4.1 | 21 | 0.01 | -3 | 27 |
|  | 39 | 950 | 60 | 15 | 25 | 34.8 | 38.2 | 27 | 4.07 | 21 | 0 | 1 | 26 |
|  | 40 | 925 | 60 | 15 | 25 | 34.8 | 38.2 | 27 | Porous | — | — | — | — |
| I | 41 | 1000 | 70 | 5 | 25 | 50.6 | 15.8 | 33.6 | 4.03 | 21 | 0.01 | 6 | 24 |
|  | 42 | 975 | 70 | 5 | 25 | 50.6 | 15.8 | 33.6 | 4.04 | 21 | 0.02 | -4 | 25 |
|  | 43 | 950 | 70 | 5 | 25 | 50.6 | 15.8 | 33.6 | 4.02 | 21 | 0 | 7 | 21 |
|  | 44 | 925 | 70 | 5 | 25 | 50.6 | 15.8 | 33.6 | Porous | — | — | — | — |

TABLE IV

| Example | MZT Wt % | Flux Wt % | MnCO3 Wt % | Ink Ad/Pd | Sint. Temp. °C. | Density g/cm³ | Cap (1 KHz) pf | % DF (1 KHz) | Cap (1 MHz) pf | % DF (1 MHz) | UVDB (v) | K | TCC (PPM/°C.) -55° C. | TCC (PPM/°C.) +125° C. | Life Test | Comments |
|---|---|---|---|---|---|---|---|---|---|---|---|---|---|---|---|---|
| 45 | 90 | 10 | 0.1 | 85/15 | 1000 | 4.07 | 305 | 0.25 | 395 | 0.01 | 1930 | 22 | 0 | 26.5 | Failed | Plated Samples |

TABLE IV-continued

| Example | MZT Wt % | Flux Wt % | MnCO3 Wt % | Ink Ad/Pd | Sint. Temp. °C. | Density g/cm³ | Cap (1 KHz) pf | % DF (1 KHz) | Cap (1 MHz) pf | % DF (1 MHz) | UVDB (v) | K | TCC (PPM/°C.) -55° C. | TCC (PPM/°C.) +125° C. | Life Test | Comments |
|---|---|---|---|---|---|---|---|---|---|---|---|---|---|---|---|---|
| 46 | 90 | 10 | 0.1 | 85/15 | 975 | 3.97 | 371 | 0.01 | 371 | 0 | 1930 | 22 | 0 | 26.5 | Passed | Non-plated |
| 47 | 90 | 10 | 0.1 | 85/15 | 975 | 3.97 | 386 | 0.4 | 386 | 0.01 | 1930 | 22 | 0 | 26.5 | Failed | Plated Samples |
| 48 | 95 | 5 | 0.1 | 85/15 | 925 | 4.12 | 310 | 0 | 358 | 0 | 1980 | 22.6 | 28 | 8 | Passed | Non-plated |
| 49 | 95 | 5 | 0.1 | 85/15 | 925 | 4.12 | 346 | 0.019 | 346 | 0 | 1980 | 22.6 | 28 | 8 | Passed | Plated Samples |
| 50 | 95 | 5 | 0.1 | 85/15 | 1000 | 3.92 | 342 | 0 | 342 | 0 | 1980 | 22.6 | 6 | 26 | Passed | Non-plated |
| 51 | 92.5 | 7.5 | 0.1 | 85/15 | 1025 | 4.18 | 337 | 0 | 352 | 0 | 2030 | 23.2 | 25 | 11 | Passed | Non-plated |
| 52 | 92.5 | 7.5 | 0.1 | 85/15 | 1025 | 4.18 | 349 | 0.02 | 349 | 0 | 2030 | 23.2 | 25 | 11 | Passed | Plated Samples |
| 53 | 92.5 | 7.5 | 0.1 | 85/15 | 1000 | 4.14 | 354 | 0 | 354 | 0 | 2030 | 23.2 | 18 | 15 | Passed | Non-plated |

TABLE V

| Example | MZT + Ca (wt. %) | Flux (wt. %) | MnCO3 (wt. %) | Sinter. Temp. °C. | Density gm/cc | K | % DF | TCC (PPM) -55° C. | TCC (PPM) +125° C. |
|---|---|---|---|---|---|---|---|---|---|
| 54 | 99.9 | 0 | 0.1 | 1130 | 4.07 | 22 | 0.09 | 19 | −66 |
| 55 | 97.9 | 2 | 0.1 | 1130 | 4.23 | 23 | 0 | 30 | −70 |
| 56 | 96.9 | 3 | 0.1 | 1130 | 4.21 | 23 | 0 | 35 | −78 |
| 57 | 95.9 | 4 | 0.1 | 1130 | 4.18 | 23 | 0 | 35 | −81 |
| 58 | 95 | 5 | 0 | 950 | Porous | 18 | 0 | −9 | 18 |
| 59 | 95 | 5 | 0 | 1000 | 4.12 | 22 | 0 | 11 | 8 |
| 60 | 92 | 8 | 0 | 950 | 3.91 | 20 | 0 | −14 | 27 |
| 61 | 92 | 8 | 0 | 1000 | 4.14 | 22 | 0 | 12 | 6 |
| 62 | 90 | 10 | 0 | 950 | 4.11 | 21 | 0.01 | 9 | 19 |
| 63 | 88 | 12 | 0 | 950 | 4.12 | 21 | 0.01 | 11 | 23 |
| 64 | 88 | 12 | 0 | 950 | 4.02 | 20 | 0 | −11 | 19 |
| 65 | 88 | 12 | 0 | 1000 | 4.11 | 22 | 0 | 7 | 11 |

What is claimed is:

1. A dielectric ceramic powder mixture consisting essentially of agglomerates, each of said agglomerates comprising a homogenous group of two kinds of powder particles having been mildly calcined and superficially co-reacted to bind said group of powder particles together to form said each agglomerates, said two kinds of powder particles in said each agglomerates being comprised, respectively, of from 87 to 98 weight percent of a magnesium zinc titanate powder, and from 2 to 13 weight percent of a powdered barium lithium boro-silicate sintering flux.

2. The dielectric ceramic powder mixture of claim 1 wherein said barium lithium boro-silicate flux is composed of from 10 to 55 weight percent $Li_4SiO_4$, from 3 to 40 weight percent $BaO.B_2O_3$ and 10 to 76 weight percent $3BaO.B_2O_3$.

3. The dielectric ceramic powder mixture of claim 1 wherein said barium lithium boro-silicate flux is composed of 22 to 26 weight percent $Li_4SiO_4$, 20.5 to 23.5 weight percent $BaO.B_2O_3$ and 50 to 56 percent $3BaO.B_2O_3$.

4. The dielectric ceramic powder mixture of claim 1 wherein said magnesium zinc titanate powder is the fully reacted compound $Mg_{2/3}Zn_{1/3}TiO_3$ in which there has been substituted for up to 20 percent of said Mg an equal molar amount of an alkaline earth metal.

5. The dielectric ceramic powder mixture of claim 4 wherein said alkaline earth metal is selected from the group consisting of calcium, strontium, barium and combinations thereof.

6. The dielectric ceramic powder mixture of claim 1 wherein said magnesium zinc titanate powder is the fully reacted compound $Mg_{2/3}Zn_{1/3}TiO_3$ in which there has been substituted for up to 60 percent of said Mg an equal molar amount of barium.

7. A method for making a dielectric ceramic powder mixture comprising:
  a) combining from 87 to 98 weight percent of a magnesium zinc titanate and from 2 to 13 weight percent of a powdered barium lithium boro-silicate sintering flux;
  b) mixing said combined powders to form a homogenous powder mixture; and
  c) mildly calcining said homogeneous mixture at from 600° C. to 750° C. to obtain a powder comprised of agglomerates of said homogeneous powder mixture wherein each of said agglomerates has essentially the same composition of magnesium zinc titanate and barium lithium boro-silicate as in said combined powders.

8. The method of claim 7 additionally comprising comminuting said mildly calcined powder to produce the dielectric ceramic powder mixture as a free flowing powder having an average agglomerate size of about 1.2 micrometers.

9. A method for making a multilayer ceramic capacitor comprising:
   a) making a slurry by milling in an organic vehicle a dielectric ceramic powder mixture consisting essentially of agglomerates, each of said agglomerates comprising a homogenous group of two kinds of powder particles having been mildly calcined and superficially co-reacted to bind said group of powder particles together to form said each agglomerates, said two kinds of powder particles in said each agglomerates being comprised, respectively, of from 87 to 98 weight percent of a magnesium zinc titanate powder, and from 2 to 13 weight percent of a powdered barium lithium boro-silicate sintering flux;
   b) forming layers of said slurry and drying the layers and depositing a first patterned film of palladium silver alloy on one of said dried layers;
   c) forming a stack by stacking at least a second green ceramic layer over said first patterned alloy film stacking, depositing a second patterned alloy film over said second green ceramic layer, and forming at least a third green ceramic layer over said second patterned film;
   d) sintering said stack at a temperature within the range of 950° C. to 1120° C. to form a dense mature ceramic body;
   e) applying a silver paste to the ends of said body to which an edge of said first and second alloy patterns may extend; and
   f) heating said stack to cure said silver paste and form terminations contacting each of said first and second alloy layers.

10. The method for making a multilayer ceramic capacitor of claim 9 additionally comprising applying a nickel film over said cured silver terminations by electroplating.

11. A multilayer ceramic capacitor comprising a dense mature ceramic body and at least one sheet electrode buried in said body, said at least one electrode extending to one body end, said body having been co-fired with said buried electrode; said body being comprised of from 87 to 98 weight percent of a magnesium zinc titanate and from 2 to 13 weight percent of a powdered barium lithium boro-silicate sintering flux.

12. The multilayer ceramic capacitor of claim 11 wherein said at least one buried electrode is an alloy of silver and palladium wherein said silver amounts to at least 80 weight percent.

13. The multilayer ceramic capacitor of claim 11 wherein said barium lithium boro-silicate flux is composed of from 10 to 55 weight percent $Li_4SiO_4$, from 3 to 40 weight percent $BaO.B_2O_3$ and from 10 to 76 weight percent $3BaO.B_2O_3$.

14. The multilayer ceramic capacitor of claim 11 wherein said barium lithium boro-silicate flux is composed of from 22 to 26 weight percent $Li_4SiO_4$, 20.5 to 23.5 weight percent $BaO.B_2O_3$ and from 50 to 56 percent $3BaO.B_2O_3$.

15. The multilayer ceramic capacitor of claim 11 wherein said magnesium zinc titanate powder is the fully reacted compound $Mg_{2/3}Zn_{1/3}TiO_3$.

16. The multilayer ceramic capacitor of claim 11 wherein said magnesium zinc titanate powder is $Mg_{2/3}Zn_{1/3}TiO_3$ wherein there has been substituted for up to 20 mole percent of said Mg an equal molar amount of an alkaline earth metal.

17. The multilayer ceramic capacitor of claim 16 wherein said alkaline earth metal is selected from the group consisting of calcium, strontium, barium and combinations thereof.

18. The multilayer ceramic capacitor of claim 11 wherein said magnesium zinc titanate powder is $Mg_{2/3}Zn_{1/3}TiO_3$ wherein there has been substituted for up to sixty mole percent of said Mg an equal molar amount of barium.

* * * * *